United States Patent [19]

Stotka

[11] Patent Number: 4,983,196

[45] Date of Patent: Jan. 8, 1991

[54] METHOD OF MOLDING ENAMEL COATED GLASS SHEET WITHOUT ADHESION TO DIE

[75] Inventor: David M. Stotka, Washington, Pa.

[73] Assignee: Ciba-Geigy Corporation, Ardsley, N.Y.

[21] Appl. No.: 270,397

[22] Filed: Nov. 9, 1988

Related U.S. Application Data

[63] Continuation of Ser. No. 150,261, Jan. 29, 1988, abandoned.

[51] Int. Cl.$^5$ .............................................. C03B 40/02
[52] U.S. Cl. ...................................... 65/24; 65/60.53; 65/60.4
[58] Field of Search ................ 65/24, 60.3, 60.4, 60.5, 65/60.53, 106, 26; 427/165, 168; 425/89; 249/115, 114.1

[56] References Cited

U.S. PATENT DOCUMENTS

| | | | |
|---|---|---|---|
| 3,961,120 | 6/1976 | Hearn et al. | 427/209 |
| 4,018,717 | 4/1977 | Francel et al. | 252/513 |
| 4,339,257 | 7/1982 | Ueda et al. | 65/60.5 |
| 4,369,063 | 1/1983 | McGowan, Jr. | 106/1.14 |
| 4,420,501 | 12/1983 | Ueda et al. | 252/512 |
| 4,547,467 | 10/1985 | Barth et al. | 501/21 |
| 4,585,580 | 4/1986 | Donohue | 252/521 |
| 4,596,590 | 6/1986 | Boaz | 65/60.51 |
| 4,649,062 | 3/1987 | Kosiorek et al. | 427/228 |
| 4,684,388 | 8/1987 | Boaz | 65/60.5 |
| 4,684,389 | 8/1987 | Boaz | 65/60.5 |

FOREIGN PATENT DOCUMENTS

1376946 12/1974 United Kingdom.

OTHER PUBLICATIONS

Chem. Abstracts, 104, 154517b (1986).
F. H. Norton Elements of Ceramics, 1952, pp. 197–202.

*Primary Examiner*—Kenneth M. Schor
*Assistant Examiner*—John J. Bruckner
*Attorney, Agent, or Firm*—Harry Falber

[57] ABSTRACT

In glass enamel coating compositions containing a glass frit system, a metal oxide pigment and a vehicle therefor, the improvement comprising the presence of iron metal powder to provide anti-stick, color maintenance and adhesion properties; the resulting coatings being particularly effective for application to glass sheets which are subsequently subjected to high temperature forming procedures.

11 Claims, No Drawings

METHOD OF MOLDING ENAMEL COATED GLASS SHEET WITHOUT ADHESION TO DIE

This application is a continuation of application Ser. No. 150,261, filed Jan. 29, 1988 now abandoned.

Glass enamel paint compositions are well known to those skilled in the art. These materials can be utilized for a variety of applications but are of particular use in decorating glass sheets. For example, the coatings may be used to form borders around the edge of glass sheets which are converted into windshields, sidelites or backlites in motor vehicles.

It has been noted, however, that when glass sheets having the glass enamel coated thereon are subjected to a forming process at elevated temperatures, the prior art coatings exhibit a tendency to adhere to the materials covering the forming die. Accordingly, such prior art materials are unavailable for use in glass forming processes in which a heated glass sheet coated with the glass enamel is engaged by a material-covered forming die, generally a fiberglass-covered forming die.

Various approaches have been suggested in order to facilitate the forming of glass sheets with a glass enamel coated thereon and to withstand the elevated bending or forming temperatures and the repeated contact of the glass sheet and the covered forming die without having the enamel adhere to the forming die. For example, U.S. Pat. No. 4,596,590 discloses the addition of metal oxide powder, including ferrous oxide, to the paint composition to provide the desired non-stick barrier between the coating and the fiberglass-covered forming die. U.S. Pat. Nos. 4,684,388 and 4,684,389 disclose similar approaches, the former patent adding a mixture of finely divided zinc metal powder and finely divided stannous oxide powder as the anti-stick barrier and the latter patent adding finely divided zinc metal powder for the similar effect. Although each of these systems has been effective in reducing the indicated problem, greater reduction of adhesion and further improvement of surface appearance are still desired.

It is the primary object of this invention to provide an improved glass enamel coating composition.

It is a further object to provide such coatings which are readily available for application to glass sheets and which exhibit anti-stick properties during glass formation.

Various other objects and advantages of this invention will become apparent from the following description thereof.

It has now been surprisingly discovered that by introducing iron powder into glass enamel compositions, the difficulties encountered with prior art formulations are substantially overcome. Thus, the resulting compositions can be readily applied to glass sheets and facilitate the formation of a smooth continuous coating which does not adhere to the fiberglass die coating when the heated coated glass is contacted with such materials. Accordingly, the bending or forming operations are not hindered by the above described sticking phenomenon. In addition, such enamel compositions exhibit increased opacity and increased glass adhesion. In particular, the presence of iron powder in UV curable coatings substantially eliminates the potential for release of the enamel from the glass substrate.

The invention thus relates to the improved glass enamel composition and to the glass forming method utilizing such enamels. More specifically, the glass enamel compositions contain, as the primary ingredients, iron powder, glass frit, metal oxide pigment and vehicle.

Any conventional soft glass frit or frit mixture can be utilized in the instant formulation. The frit will generally be ground to pass through 325 mesh screen (U.S. Standard Sieve size). The primary purpose of the frit is to bond the pigmentary product to the glass surface. The frit may comprise any appropriate combination of metal oxides. Typical oxides may be selected from the oxides of zinc, lead, silicon, titanium, zirconium, sodium, boron, lithium, potassium, calcium, aluminum, tin, vanadium, molybdenum, magnesium, iron, manganese and the like. Correspondingly, various fluorides may appear in the frit. The batch composition which will provide the above noted oxides and fluorides may contain various salts, such as oxides, carbonates, sulfates, nitrates, fluorides and the like, of the above noted metals. The batch ingredients are selected in order to achieve predetermined frit properties. Lead, zinc alkali and bismuth alkali borosilicate frits are preferred for purposes of this invention.

The frit is prepared by melting the batch ingredients at temperatures of from about 900° to 1600° C. and then quenching the molten glass either with the use of water or by pouring the melt between two cooled metal rolls rotating in opposite direction. Melting generally is conducted in a ceramic or platinum crucible or in an appropriately lined furnace. The resulting chips, chunks or flakes of frit are then ground into fine particles.

Metal oxide pigments are well known to those skilled in the art. Applicable oxides include, for example, chrome, cobalt, iron, nickel, copper, manganese, and the like. Although the latter metal oxides form preferred black spinel pigments, other variations to produce dark gray and other colors are likewise contemplated.

The vehicle is selected on the basis of the end use application. It is essential that the vehicle adequately suspend the particulates and burn off completely upon firing of the composition. Vehicles are typically organic and include compositions based on pine oils, vegetable oils, mineral oils, low molecular weight petroleum fractions, tridecyl alcohol, and the like. The vehicles may be modified by viscous resins such as vinyl resins, solvents, film formers such as cellulosic materials, and the like.

Correspondingly, UV-base vehicles are equally applicable for use in the instant invention. Such UV-base vehicles are well known to those skilled in the art and will generally be composed of polymerizable monomers and/or oligomers containing, for example, acrylate or methacrylate functional groups, together with photoinitiators and polymerization inhibitors. Representative systems are disclosed in U.S. Pat. Nos. 4,306,012 and 4,649,062. As is recognized, such systems are cured with ultraviolet radiation after application to the glass substrate.

The modified glass enamels contain from about 2–75% of iron powder and preferably 5–35%; from about 10 to 85% glass frit/pigment combination and preferably 30 to 65%; and from about 10 to 45% vehicle and preferably 14 to 30%. The percentages are based on the weight of the formulated glass enamel paste. The pigment component will generally comprise from 10 to 40%, by weight, of the indicated combined oxide system. The resulting compositions will be viscous in nature, the viscosity depending on application method and end use. For purposes of screen printing, viscosities ranging from 10,000–80,000, and preferably 20,000–65,000, centipoises at 20° C. as determined on a Brookfield Viscometer, #7 spindle at 20 rpm are appropriate.

A wide variety of optional ingredients may be included in these formulations. These may be added to modify viscosity and to enhance properties such as bond strength and abrasion resistance. Various bismuth and bismuth-containing compounds for bond strength; certain refractory materials such as zirconium oxide to increase abrasion resistance; suspending agents such as iso-stearic acid; and fumed silica and other silica products to modify viscosity; may be included for the indicated benefits.

The compositions are prepared by blending the solid materials, adding the liquid ingredients thereto and then thoroughly mixing or kneading the two in order to form a smooth, thick paste. The paste is then further dispersed by means of a conventional machine such as a three-roll mill or dispersator such as a Cowles or Morehouse mill.

Methods for applying the enamel coatings are well known to those skilled in the art. The dispersed compositions may be applied by techniques such as screen printing, decal application, spraying, brushing, roller coating, and the like. Screen printing is preferred for purposes of applying the composition to glass substrates.

After the enamel has been applied to the glass sheet, the glass sheet is heated to a temperature which softens the glass sufficiently so that the glass sheet can be formed. Generally, this temperature is in a range of about 600°–760° C. Compositions which are formulated to be responsive to UV radiation may be exposed to such radiation prior to heating to bond the enamel to the glass sheet. After heating, the glass sheet and the enamel thereon are engaged by the fiberglass covered forming die to place the heated glass sheet into a desired shape. The heating operation, of course, burns off the organic materials contained in the enamel and bonds the remaining portion of the enamel to the glass sheet. The iron powder addition to the enamel serves to prevent sticking of any of the enamel to the forming die and also provides a smooth continuous surface to the resulting enamelled surface.

After the forming die has been removed from engagement with the glass sheet and the enamel without any sticking of the enamel thereto, the glass sheet may be cooled to obtain a formed glass sheet with enamel thereon. The glass sheet may be rapidly cooled in a glass tempering operation to achieve a tempered glass product having the enamel thereon or annealed when utilized for windshield applications. The resulting glass sheet is then readily available for use in a variety of applications, particularly the automotive applications noted hereinabove.

Glass enamel paint compositions are also formulated with silver metal in order to provide conductive coatings for use, for example, as defrost circuits for automotive backlites and windshield. In such areas of utility, color maintenance, bond strength, solderability, absence of silver migration and abrasion resistance are required performance characteristics. It is to be noted that the instant iron powder-containing systems are particularly applicable for use in conjunction with such conductive coatings for the above noted areas of utility. When the conductive coatings are applied in overlapping relationship with the iron-containing systems, performance improvements as observed after heat treatment include good resistance to silver migration into the enamel, substantial reduction of undesirable blue haze of the buss bar (bar connecting ends of individual horizontal conductive elements of defrost circuit) and permanence of solder connections.

The following examples further illustrate the embodiments of this invention. In these examples, all parts are given by weight unless otherwise specified.

EXAMPLE 1

This example illustrates the preparation and application of typical enamels of this invention.

The following formulations are prepared:

| | %, by weight | | | | | | | | |
|---|---|---|---|---|---|---|---|---|---|
| | 1 | 2 | 3 | 4 | 5 | 6 | A | B | C |
| Lead borosilicate/black spinel pigment blend (glass enamel powder) | 61.5 | 61.5 | 59.8 | 59.8 | 70.4 | 70.4 | 81 | 81 | 81 |
| Pine Oil-Based Vehicle | 15.4 | — | 17.1 | — | 17.6 | — | 19 | — | — |
| UV-base vehicle(1) | — | 15.4 | — | — | — | 17.6 | — | 19 | — |
| UV-base vehicle(2) | — | — | — | 17.1 | — | — | — | — | 19 |
| Iron powder (−325 mesh) | 23.1 | 23.1 | 23.1 | 23.1 | 12.0 | 12.0 | — | — | — |

(1)1708 from Drakenfeld Colors
(2)1718 from Drakenfeld Colors

The enamels are prepared by blending the liquid and solid ingredients and then dispersing the paste in an appropriate mill.

The performance characteristics of the enamels are determined in a laboratory screening procedure by applying the enamels to 10.2 cm × 10.2 cm × 4 mm glass plates, heating the slide to 705° C. for 3 minutes, impressing a slightly curved, ceramic cloth covered press bar at a estimated pressure of 25–50 pounds onto the softened glass for a period of five seconds with a rolling motion, removing the press bar and visually identifying the degree of adhesion between the enamel and the ceramic cloth.

Each of formulations 1–6 exhibited virtually no adhesion as evidenced by the almost complete absence of ceramic cloth on the plate. In contrast, formulations A, B and C exhibited noticeable amounts of ceramic cloth on the plate indicative of undesirable adhesion.

EXAMPLE 2

Formulation B is utilized as the base composition for each of the following test procedures, incorporating iron as indicated.

In each instance, the iron-containing glass enamel is screen printed onto the glass and cured at a rate of 1067 cm./minute under a mercury vapor lamp (ID/1 Hg). Thereafter, a conductive coating of 70% silver metal, 3% glass frits and 27% tridecyl alcohol-based vehicle (all percentages by weight) is screen printed over the cured iron-containing glass enamel so as to provide areas of overlap and then dried. The dual coated glass panel is them fired in a vertical position at the indicated temperatures and firing times. Observations are then made as to opacity and anti-stick characteristics for the individual glass enamel coating. In addition, the degree of "release" is determined, this being the condition where the cured enamel begins to lose its adhesion to the glass substrate as indentified by the appearance of silvery or white dots indicative of release onset when looking through the glass to the underside of the enamel. In addition, the overlapping areas are evaluated for enamel development (surface hardness) and resistance to silver migration into the iron-containing glass enamel.

Test condition 1 = 705° C. fire temperature for 2.25 minutes

Test condition 2 = 705° C. fire temperature for 2.75 minutes

Test condition 3 = 730° C. fire temperature for 3 minutes

| TC | Fe (%, by wt.) | ED | SB | OP | R | A-S |
|----|----------------|----|----|----|----|-----|
| 1  | 5              | F  | G  | G  | E  | —   |
| 1  | 10             | G  | E  | E  | E  | —   |
| 1  | 20             | E  | E  | E  | E  | G   |
| 1  | 30             | E  | E  | E  | E  | E   |
| 2  | 5              | G  | G  | G  | E  | —   |
| 2  | 10             | E  | E  | E  | E  | —   |
| 2  | 20             | E  | E  | E  | E  | G   |
| 2  | 30             | E  | E  | E  | E  | E   |
| 3  | 5              | G  | G  | G  | E  | F   |
| 3  | 10             | G  | G  | G  | E  | G   |
| 3  | 15             | G  | G  | G  | E  | G   |
| 3  | 20             | G  | G  | G  | E  | G   |
| 3  | 25             | G  | G  | G  | E  | E   |
| 3  | 30             | F  | F  | G  | E  | E   |
| 3  | 35             | —  | —  | —  | E  | E   |
| 3  | 40             | —  | —  | —  | E  | G   |

TC = test condition
ED = enamel development
SB = resistance to silver migration
OP = opacity
R = absence of release
A-S = anti-stick
F = fair performance
G = good performance
E = excellent performance When control B is subjected to these tests, silver migration and reduced anti-stick properties are in evidence.

EXAMPLE 3

The general preparative procedure of Example 2 is repeated. Thereafter, solderability characteristics are determined by slightly abrading the buss bar, lightly soldering a tin-plated copper braid thereto using 1.27 cm Bi/As/Sn solder at a solder temperature of 400° C., allowing the soldered section to cool to ambient temperature and utilizing an Instron Model 1000 tensile tester to measure the force necessary to remove the braid. The results are as follows:

| TC | Fe (%, by wt.) | Solder Pull (lbs.) |
|----|----------------|--------------------|
| 1  | 5              | 18.2               |
| 1  | —              | 16.4               |
| 2  | 5              | 9.1                |
| 2  | —              | 0.0                |
| 1  | 10             | 18.3               |
| 1  | —              | 13.1               |
| 2  | 10             | 10.3               |

-continued

| TC | Fe (%, by wt.) | Solder Pull (lbs.) |
|----|----------------|--------------------|
| 2  | —              | 0.0                |
| 1  | 20             | 14.2               |
| 1  | —              | 11.4               |
| 2  | 20             | 12.9               |
| 2  | —              | 0.0                |

These data thus illustrate a further performance benefit of the glass enamels of this invention.

Summarizing, this invention provides glass enamel compositions exhibiting a wide variety of performance improvements as a result of the presence of iron powder therein. Variations may be made in procedures, proportions and materials without departing from the scope of the invention as defined by the following claims.

What is claimed is:

1. In the method for forming a glass enamel coated glass sheet, the glass enamel composition comprising a glass frit, a metal oxide pigment and a vehicle for the glass enamel, wherein the glass enamel composition is coated onto the glass sheet, the coated glass sheet is then heated to soften the sheet, to remove the volatiles in said enamel and to bond the remainder of the enamel to the sheet, the softened coated glass sheet is then contacted with a fibrous material covered forming die, the forming die is then removed and the glass sheet cooled; the improvement comprising prior to coating the frit onto the glass sheet incorporating into the enamel composition from about 2-75%, by weight, of iron metal powder whereby said enamel composition exhibits virtually no adhesion to the fibrous material during the period which it contacts said fibrous material of said forming die in the glass sheet contacting step.

2. The method of claim 1, wherein said vehicle is a UV curable vehicle and wherein the coated glass sheet is cured with ultraviolet radiation prior to the heating step.

3. The method of claim 2, wherein said enamel composition comprises a lead borosilicate frit, a black spinel pigment, iron metal powder and a UV curable vehicle for the glass enamel.

4. The method of claim 1, wherein said glass frit comprises a mixture of metal oxides.

5. The method of claim 4, wherein said oxides are selected from the group consisting of zinc, lead, silicon, titanium, zirconium, sodium, boron, lithium, potassium, calcium, aluminum, tin, vanadium, molybdenum, magnesium, iron and manganese oxides.

6. The method of claim 5, wherein said frit is a lead borosilicate glass frit.

7. The method of claim 1, wherein an organic vehicle is present.

8. The method of claim 7, wherein said vehicle contains pine oil, vegetable oils, mineral oils, low molecular weight petroleum fractions or tridecyl alcohol.

9. The method of claim 8, wherein said vehicle contains pine oil.

10. The method of claim 1, wherein said pigment is a black spinel pigment.

11. The method of claim 1 wherein said enamel composition comprises a lead-borosilicate frit, a black spinel pigment, iron powder and a pine oil-based vehicle therefor.

* * * * *